UNITED STATES PATENT OFFICE.

ALBERT H. KOEFOED, OF NEW YORK, N. Y., AND THOMAS B. STILLMAN, OF HOBOKEN, NEW JERSEY.

METHOD OF TREATING PHOSPHATES OF IRON AND ALUMINA.

SPECIFICATION forming part of Letters Patent No. 281,635, dated July 17, 1883.

Application filed June 7, 1883. (No specimens.)

*To all whom it may concern:*

Be it known that we, ALBERT H. KOEFOED, a citizen of the United States, residing at New York, in the county and State of New York, and THOMAS B. STILLMAN, a citizen of the United States, residing at Hoboken, in the county of Hudson and State of New Jersey, have invented new and useful Improvements in Methods of Treating Insoluble Phosphates, &c., of which the following is a specification.

This invention relates to the method of treating the insoluble phosphates of iron and alumina, and rendering the phosphoric acid in the same soluble and available. The rock containing the insoluble phosphates is finely powdered and mixed with powdered dolomite (or limestone) and calcined in a furnace at a high temperature. The result is as follows: The phosphoric acid in the native rocks is separated from the iron and alumina and unites with the magnesia and lime as phosphates of magnesia and lime. The carbonic acid in the dolomite is driven out at a heat lower than that required to separate the phosphoric acid from the iron and alumina, so that the lime and the magnesia, being in the caustic state, immediately absorb the phosphoric acid driven off from the iron and alumina, forming phosphate of magnesia and lime. The iron and alumina remain in the condition of insoluble oxides, and as such are not affected by the later treatment of acid. After heating, which can be performed in any furnace capable of producing the required heat, the mass is allowed to cool and then pulverized finely before it is subjected to the action of sulphuric acid to form superphosphates, or to set free the phosphoric acid. In place of sulphuric acid, any acid that will set free the phosphoric acid may be employed—as, for example, muriatic acid. If, after the calcination of the phosphate rocks and digestion with sulphuric acid or any acid capable of rendering the phosphoric acid soluble, water, either hot or cold, is added, the soluble portions filtered off, and the water in the filtrate driven off by heat, the mass, after drying, will be found to be very rich in phosphoric acid, and being in the form of a dry powder it can be added directly to any fertilizer and distributed by drills, or it can be packed up for the market without further treatment.

This process, as is seen, furnishes means for forming concentrated solutions or dried salts of a mixture of phosphoric acid, soluble phosphate of lime, and phosphate of magnesia, either separately or together, which by concentration will produce a residue containing from twenty to forty per cent., and over, of phosphoric acid. The addition of the sulphuric acid, above mentioned, to the calcined mass of dolomite or limestone and phosphate rock gives rise to the following reaction: The sulphuric acid combines with the lime, forming sulphate of lime, which is insoluble, at the same time separating the phosphoric acid from the lime, rendering the acid free. By the addition of water sufficient to form a liquid mass and subsequent filtrations the separation of the soluble material from the insoluble material can be attained, the soluble material being composed of or containing free phosphoric acid, also traces of phosphate of magnesia and sulphate of magnesia, and more or less soluble phosphates of lime that pass into solution, as also some free sulphuric acid. These soluble substances are separated from the oxides of iron and alumina and sulphate of lime, and by concentration by evaporation a material can be obtained very rich in phosphoric acid. The filtration or separation can be performed by settling-tanks, or preferably by pressure-filters.

The proportions of materials may vary, but the following have been found to give good results: To one hundred parts of the phosphate add seventy-five parts of dolomite, and if carbonaceous matter is used add about thirty parts of coal, coke, or any substitute to serve as a combustible or heating agent:

We are aware that it is not broadly new to heat phosphatic rocks in a furnace with dolomite or limestone, or both; and we are also aware that soluble phosphates have been formed by burning and the addition of mineral acid followed by leaching and concentration.

Having thus described our invention, what we claim is—

1. The method of treating insoluble phosphates by mixing the same in a powdered state with powdered dolomite or limestone, calcining the mixture, and then pulverizing the fused mass and treating the same with a mineral acid, substantially as and for the purpose set forth.

2. The method of treating insoluble phosphates by mixing the same in a powdered state with powdered dolomite or limestone, calcining the mixture, and then pulverizing the fused mass and treating the same with a mineral acid and with water and filtering the same, substantially as described.

In testimony whereof we have hereunto set our hands and seals in the presence of two subscribing witnesses.

ALBERT H. KOEFOED. [L. S.]
THOMAS B. STILLMAN. [L. S.]

Witnesses:
W. HAUFF,
E. F. KASTENHUBER.